Patented Mar. 29, 1949

2,465,730

UNITED STATES PATENT OFFICE 2,465,730

METHOD OF PRODUCING METALLIC SODIUM

William J. Kroll, Albany, Oreg.

No Drawing. Application June 28, 1946, Serial No. 680,080

4 Claims. (Cl. 75—66)

This invention relates to metallurgy and more particularly to a process for producing metallic sodium.

Heretofore in the art several different pyrometallurgical methods have been proposed for producing metallic sodium involving the reduction of sodium compounds by a reducing agent at elevated temperatures above the vaporization temperature of sodium and the condensation of the vaporized sodium. In most, if not all, of these pyrometallurgical methods the recovery of the vaporized metallic sodium is complicated by the presence of gases evolved during the reduction reaction, with which gases certain reverse reactions accompanied by losses of metallic sodium are likely to occur as the temperatures vary. In others, the efficiency of the reduction reaction is relatively low.

I have discovered that metallic sodium may be produced in an economically practical manner by heating a mixture consisting of sodium chloride, silicon and an alkaline earth metal oxide to elevated temperatures within the range 750–900° C. in a high vacuo, the vaporized sodium being recovered by condensation upon a cooled condenser surface in the same high vacuo.

In the practice of the present invention I have found that the reduction reaction involved is primarily a reduction of the alkaline earth metal oxide by the silicon and secondarily a reduction of the sodium chloride by the calcium produced in the primary reduction reaction. To bring about these two reactions in an economically practical manner it is essential, first, to provide a large excess of the alkaline earth metal oxide over that theoretically required to complete the two reactions; second, to maintain a temperature closely approximating 850° C.; third, to maintain a pressure below about 250 microns in the high vacuo employed; and, fourth, to compact the mixture into porous briquets having a maximum thickness permitting ready vaporization of the sodium from the briquet interior.

The large excess of the alkaline earth metal is required for two reasons. The first reason is to accelerate and to make certain the prompt initiation and rapid continuation of the primary reduction producing the alkaline earth metal for the secondary reduction reaction. The second reason is to provide a sufficient excess of the alkaline earth metal oxide to maintain the porosity of the briquets during the progress of the secondary reaction by inhibiting the formation of low melting chloride eutectics.

The primary and secondary reactions involved in the instant invention can be illustrated by the following equations:

(1) $\quad 2CaO + Si = SiO_2 + 2Ca$
(2) $\quad 2Ca + 4NaCl = 2CaCl_2 + 4Na$
(3) $\quad 2CaO + SiO_2 = 2CaO \cdot SiO_2$ or combined equation:

(4) $\quad 4NaCl + 4CaO + Si = 2CaCl_2 + 2CaO \cdot SiO_2 + 4Na$

In the absence of excess CaO over that indicated in the equations, the primary reduction reaction of Equation (1) is slowed down by the sodium chloride present in the mixture.

In the absence of excess CaO, the progress of the secondary reduction reaction indicated in Equation (2) is interfered with by the formation of low melting NaCl/CaCl$_2$ eutectics which lower the porosity of the compacted mixture and prevent the sodium from being vaporized out of the briquets.

To overcome these two factors I have found that an excess of the alkaline earth metal oxide amounting to from 2 to 3 times the amount called for by Equation (4) is required.

The progress of and the efficiency of the reduction reactions are greatly effected by the temperature employed. Theoretically, a temperature above the vaporization temperature of sodium at the low pressure employed and below the boiling point or vaporization temperature of any of the other compounds present in the mixture at the low pressure employed, is utilizable in the present invention. I have found that at the low pressures employed a temperature approximating 850° C. and within the range 750–900° C. produces the best results. At temperatures over 900° C. sodium chloride tends to be vaporized at the low pressures involved. At temperatures below 750° C. the rate of sodium vaporization is too low for economical operation.

The rate of reaction (primary and secondary) is greatly effected by the pressure employed. I have found that at pressures above about 1 millimeter of mercury the rate of reaction at the above temperature is inordinately slow and that pressures below about 250 microns must be employed to obtain an economically practical rate of reaction.

The compaction of the mixture into porous briquets of limited maximum thickness is also essential, first to bring the reacting solids into reaction contact and, secondly, to permit the ready egress of the sodium metal vapor from the briquet interior. While the extent of compaction employed may vary widely, as one skilled in the art will recognize, with any given mixture an optimum pressure appears to produce the best results. This optimum pressure will be indicated in the specific embodiment hereinafter disclosed.

As a specific embodiment of the present invention, but not as a limitation of the same, I will describe the invention as it has been adapted to the production of sodium from a mixture consisting of sodium chloride, silicon and calcium oxide.

These materials, each in finely divided form passing about a 100 mesh screen, are admixed thoroughly in the relative proportions indicated in Equation (4) using 3 times the amount of calcium oxide called for by the equation.

The mixture then is compacted, under a pressure approximating 10,000 pounds per square inch, into briquets approximating one (1) inch maximum thickness. The particular means for compacting the mixture into briquets forms no part of the present invention and is, per se, old and well known in the art.

The briquets are charged into a metallic crucible, such as iron, capable of withstanding temperatures within the range 750–900° C. and the crucible and contents are enclosed within a sealed chamber provided with means to evacuate the chamber interior to pressures under 250 microns.

Within the chamber a heating means, such as an electric resistance coil, is provided surrounding the crucible, whereby the crucible and its contents may be heated to the desired temperature of 850° C.

Also, within the chamber and in relatively close-spaced relation to the crucible, a cooled condenser surface is provided for the condensation collection of the vaporized metallic sodium. In the condensation collection of the sodium vapors it is preferable to collect the sodium upon a metal surface maintained by suitable cooling means at a temperature approximating the melting point of the sodium to collect the sodium in its liquid phase thereby to avoid the formation of pyrophoric sodium deposits.

The apparatus, per se, forms no part of the present invention and may be widely varied without essential departure from the present invention. The relatively low reaction temperature involved in the present invention permits the use of a plurality of different materials of construction and the use of a plurality of different arrangements of the essential equipment above disclosed.

The time interval of heating the crucible and briquets to complete the reduction reactions involved, varies directly with the mass of the briquets at any given temperature and pressure, as one skilled in the art will perceive. Ordinarily, at temperatures approximating 850° C. and at pressures below 250 microns, the reduction reactions proceed at an economically practical rate such that relatively large masses of such briquets, approximating 2,000 pounds are completely reacted within a time interval approximating 24 hours. Various tests have indicated that about 75% of the sodium content of the briquets may be expected to be recovered as metallic sodium at the condenser. Some losses will occur in recovering the sodium from the condenser, depending upon the recovery process employed. Best results are obtained by remelting the sodium, after solidification on the condenser surface, under an atmosphere of nitrogen.

In the practice of the present invention I have found that in place of metallic silicon, various silicon-containing alloys may be employed. In general, however, in such alloys the silicon content existing as metal silicide compounds are sluggish reducing agents at the low temperature of 850° C. found most practical for the present invention. For this reason, therefore, to obtain an economically practical rate of reaction, high silicon alloys, such as high silicon ferro-silicon alloys are the preferred substitutes for metallic silicon, and only the free silicon content of these high silicon alloys is relied on as the reducing agent in the present invention and the amount of said high silicon alloy employed must be increased to an amount provided free silicon in approximately the amount indicated in Equation (4).

I have found also that magnesium oxide may replace part but not all of the calcium oxide in conformity with the following Equation (5):

(5) $4NaCl + 2MgO + 2CaO + Si = 2CaCl_2 + 2MgO \cdot SiO_2 + 4Na$

This permits the use of various dolomites in substitution for the CaO of Equation (4) adding certain economies to the process.

It is also believed apparent that the efficiency of the process is dependent upon the moisture and gas content of the reacting constituents of the mixture. The moisture and adsorbed gas content of the briquets may, in general, be controlled by means of pre-heating the briquets, during the evacuation of the reaction chamber, to temperatures below the reaction temperature range. Considerable amounts of combined gases, such as $CO_2$, also may be removed in this way. Heating of the briquets to the reaction temperature of 850 C. should not be done until a constantly maintained low pressure below 250 microns has been attained in the chamber.

Various other modifications and departures from the present invention will occur to those skilled in the art and all such are contemplated as may fall within the scope of the following claims:

What I claim is:

1. The method of producing metallic sodium in vapor form for condensation recovery, which comprises forming a mixture consisting of sodium chloride, silicon and an alkaline earth metal oxide in the relative proportions providing 4 molecular weights of sodium chloride to each molecular weight of silicon and from 4 to 12 molecular weights of the alkaline earth metal oxide for each molecular weight of silicon, compacting the mixture into porous briquets and heating the said briquets in a high vacuo below about 250 microns pressure to a temperature approximating 850° C.

2. The method of producing metallic sodium which comprises forming a mixture consisting of sodium chloride, calcium oxide and silicon, each in finely divided condition, said mixture containing about 4 molar weights of the chloride and from 4 to 12 molar weights of the oxide to each molar weight of silicon, compacting the mixture under pressure into porous briquets having a thickness not over about one inch, heating the said briquets in a high vacuo having a pressure below about 250 microns to a temperature approximating 850° C. for an extended time interval adapted to effect a reduction of the sodium chloride and the vaporization of the major portion of the sodium content thereof, and collecting the vaporized sodium upon a cooled condenser surface in the same high vacuo maintained at a temperature approximating 100° C.

3. The method of producing metallic sodium which comprises forming a mixture consisting of the finely divided constituents sodium chloride, silicon and an alkaline earth metal oxide, the relative proportions of said constituents in the mixture providing from 4 to 12 molecular weights of the alkaline earth metal oxide and 4 molecular weights of sodium chloride for each molecular weight of silicon, compacting the said mixture into porous aggregates, and heating the said aggregates in a chamber sealed from the atmosphere to a temperature within the range 750–900° C. under a reduced pressure below about 250 microns for an extended period of time effective to obtain progressively a reduction of the alkali earth metal oxide by the silicon with liberation of free alkaline earth metal and the reduction of the sodium chloride by said free alkaline earth metal with liberation of the sodium in its vapor state, and condensing the said vaporized sodium in the same high vacuo at a point remote from the heated aggregates.

4. The method of claim 3, wherein magnesium oxide in an amount approximating 2 molar weights for each molar weight of silicon present in the mixture is added to the mixture in part substitution for an equivalent molar weight of alkaline earth metal oxide.

WILLIAM J. KROLL.

REFERENCES CITED

The following references are of record in the file of this patent:

UNITED STATES PATENTS

| Number | Name | Date |
|---|---|---|
| 2,200,906 | Wood | May 14, 1940 |
| 2,258,374 | Amati | Oct. 7, 1941 |
| 2,391,728 | McConica, III, et al. | Dec. 25, 1945 |
| 2,393,080 | Waring | Jan. 15, 1946 |
| 2,424,512 | Stauffer | July 22, 1947 |